United States Patent [19]

Kim

[11] Patent Number: 5,907,639
[45] Date of Patent: May 25, 1999

[54] BASELINE-BASED SHAPE CODING METHOD AND APPARATUS FOR ENCODING A CONTOUR IMAGE

[75] Inventor: Jin-Hun Kim, Seoul, Rep. of Korea

[73] Assignee: Daewoo Electronics Co., Ltd., Seoul, Rep. of Korea

[21] Appl. No.: 08/748,583

[22] Filed: Nov. 13, 1996

[30] Foreign Application Priority Data

Sep. 19, 1996 [KR] Rep. of Korea ............ 96-40890

[51] Int. Cl.$^6$ ..................................... G06K 9/36
[52] U.S. Cl. ......................................... 382/242
[58] Field of Search ....................... 382/100, 145, 382/159, 181, 197–199, 242

[56] References Cited

U.S. PATENT DOCUMENTS

| | | | |
|---|---|---|---|
| 4,345,245 | 8/1982 | Vella et al. | 382/181 |
| 4,817,166 | 3/1989 | Gonzalez et al. | 382/100 |
| 5,081,685 | 1/1992 | Jones, III et al. | 382/100 |
| 5,371,690 | 12/1994 | Engel et al. | 382/145 |
| 5,438,630 | 8/1995 | Chen et al. | 382/159 |

*Primary Examiner*—Jose L. Couso
*Attorney, Agent, or Firm*—Pennie & Edmonds LLP

[57] ABSTRACT

An apparatus for encoding a contour of an object in a video signal by using a baseline-based shape coding technique first determines a baseline based on contour image data and generates a one-dimensional sample list of the contour based on the baseline. Subsequently, the apparatus produces a reconstructed contour based on the one-dimensional sample list and extracts the difference between the reconstructed contour and the original contour. The detected difference is sampled in order to create an error sample list and, finally, the one-dimensional sample list is compensated based on the error sample list.

18 Claims, 5 Drawing Sheets

BASELINE-BASED SHAPE CODING METHOD AND APPARATUS FOR ENCODING A CONTOUR IMAGE

FIELD OF THE INVENTION

The present invention relates to a method and apparatus for encoding a video signal; and, more particularly, to an improved method and apparatus capable of encoding a contour of an object contained in a video signal by using a baseline-based shape coding technique.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is inevitable to compress or reduce the volume of data through the use of various data compression techniques, especially, in the case of such low bit-rate video signal encoders as video-telephone and teleconference system.

One of such techniques for encoding video signals for a low bit-rate encoding system is an object-oriented analysis-synthesis coding technique, wherein an input video image is divided into objects, and three sets of parameters for defining the motion, the contour and the pixel data of each object are processed through different encoding channels.

In processing a contour of an object, contour information is important for the analysis and synthesis of the object's shape. A classical coding method for representing the contour information is a chain coding method. The chain coding method, however, requires a substantial amount of bits for the representation thereof, although there is no loss in the contour information.

To overcome the drawback, therefore, there have been proposed several methods to encode the contour information. Among such encoding methods, there is a method employing a polygonal approximation. However, the polygonal approximation has disadvantages such as roughness in the representation of the contour and weak relativity between adjacent approximation data due to the characteristic of the polygonal approximation.

One of the techniques introduced to ameliorate such problems is a baseline-based shape coding technique disclosed by Lee et al. in "Core-experiment Results on Comparison of Shape Coding Techniques(S4)", International Organisation for Standardisation, Coding of Moving Pictures and Associated Audio Information, ISO/IEC JTC1/SC29/WG11 MPEG96/0907, January 1996. This technique first selects a baseline and determines a sampling interval to take N number of sample points on the baseline, N being a positive integer. Subsequently, 2 N contour samples are extracted for all sample points and converted to a one-dimensional(1D) sample list. The 1D sample list is used to make a processed shape. Then, the shape difference between the original shape and the processed shape is generated and sampled to extract an error sample list of the contour. Finally, the 1D sample list and the error sample list are encoded to be transmitted. Accordingly, it is possible to remedy the serious problems occurred by using the polygonal approximation through the above baseline-based shape coding technique.

However, it still remains desirable to enhance the coding efficiency suffering from large differential values between adjacent contour samples in the 1D sample list which may be induced by the shape difference between the original and the processed shapes of the contour.

SUMMARY OF THE INVENTION

It is, therefore, a primary object of the invention to provide an improved method and apparatus for encoding a contour of an object in a video signal, which is capable of enhancing the efficiency of encoding the contour through compensating large differential values between sampled data of the contour.

In accordance with the invention, there is provided a method for encoding a contour of an object expressed in a video signal, wherein the method comprises the steps of: (a) determining a baseline based on contour image data representing the contour to thereby provide baseline information; (b) sampling the contour based on the baseline information to thereby generate a one-dimensional sample list, wherein the one-dimensional sample list has a plurality of sampled values; (c) producing a reconstructed contour by using the one-dimensional sample list; (d) extracting a difference between the reconstructed contour and the original contour and sampling it based on the baseline to thereby create an error sample list; (e) compensating differences between adjacent sampled values in the one-dimensional sample list by utilizing the error sample list; and (f) encoding the compensated one-dimensional sample list, the error sample list and the baseline information.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
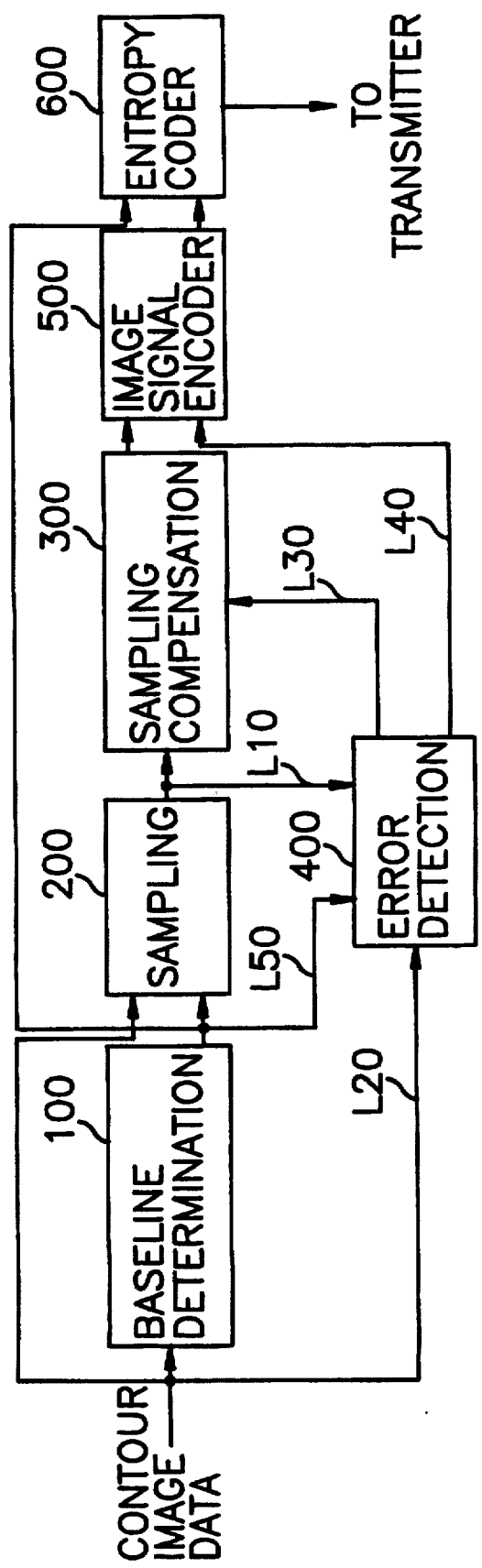
FIG. 1 depicts a schematic block diagram of the inventive apparatus for encoding a contour of an object.

Referring to FIG. 1, there is shown a schematic block diagram of the inventive apparatus for encoding a contour of an object expressed in a video signal in accordance with the preferred embodiment of the present invention.

Contour image data of the object in the video signal is inputted to a baseline determination block 100, a sampling block 200 and an error detection block 400.

The baseline determination block 100 generates a bounding rectangle surrounding the contour tightly to determine a suitable baseline. The baseline is determined by the ratio between the width and height of the contour. That is, the longer of horizontal and vertical sides of the bounding rectangle of the contour is selected as the baseline. Once the baseline is determined, baseline information representing the position of the baseline is transferred to the next processing blocks, i.e., the sampling block 200, the error detection block 400 through a line L50 and an entropy coder 600.

The sampling block 200 produces a 1D sample list of the contour based on the baseline information from the baseline determination block 100 and the contour image data inputted thereto.

Figure 3:
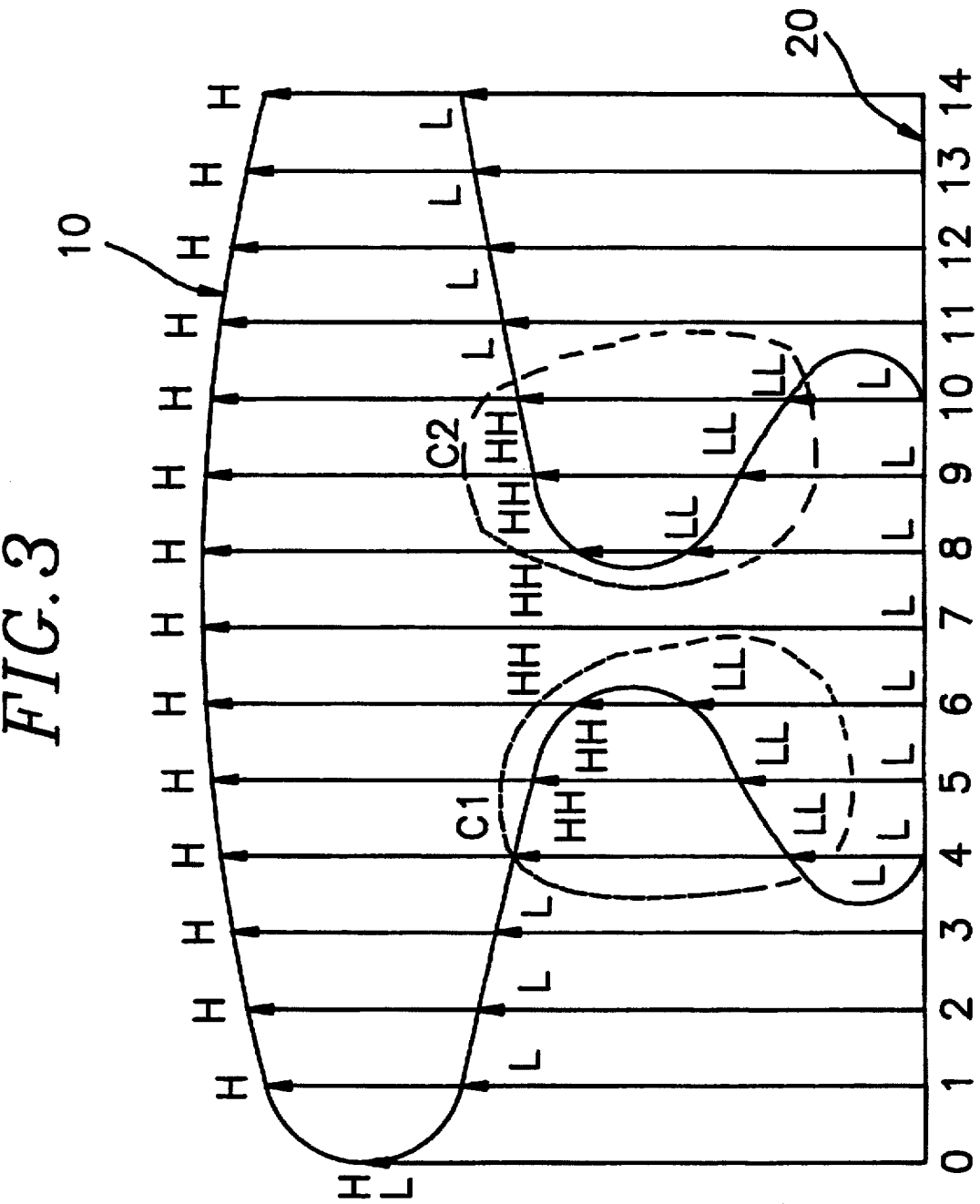
FIG. 3 illustrates an exemplary sampling process of a contour of an object.

Referring to FIG. 3, the sampling block 200 first designates the baseline 20 corresponding to the contour 10 containing concaves C1 and C2 based on the baseline information; takes and indexes N sample points, e.g., 0 to 14, on the baseline 20, wherein the N sample points are equi-distanced on the baseline 20 with N being a positive integer; draws vertical lines to the baseline 20 at each of the sample points, which intersect with the contour 10; and selects, for each of the sample points, a pair among sample values for each of the sample points, each sample value representing the distance from each of the sample points to each intersection point between a vertical line at each sample point and the contour 10. In the above, if a vertical line to the baseline 20 at a sample point intersects with the contour 10 at more than 2 contour pixels on the contour 10, both of the highest and the lowest sample values for the sample point are selected as a pair of sample values for the sample point. On the other hand, if a vertical line to the baseline 20 at a sample point comes in contact with the contour 10 at a single contour pixel on the contour 10, the sample value at the contour pixel is selected twice to thereby provide a pair of sample values for the sample point.

That is to say, as shown in FIG. 3, although the sample point 4 intersects with the contour 10 at four contour pixels and, therefore, has four sample values L4, LL4, HH4 and H4, only two sample values L4, the lowest, and H4, the highest, are selected as a pair of sample values for the sample point 4. On the other side, as for the sample point 0, there exists only one intersection point and the sample value at the intersection point is used for both sample values H0 and L0 representing a pair of sample values for the sample point 0.

Figure 4A:
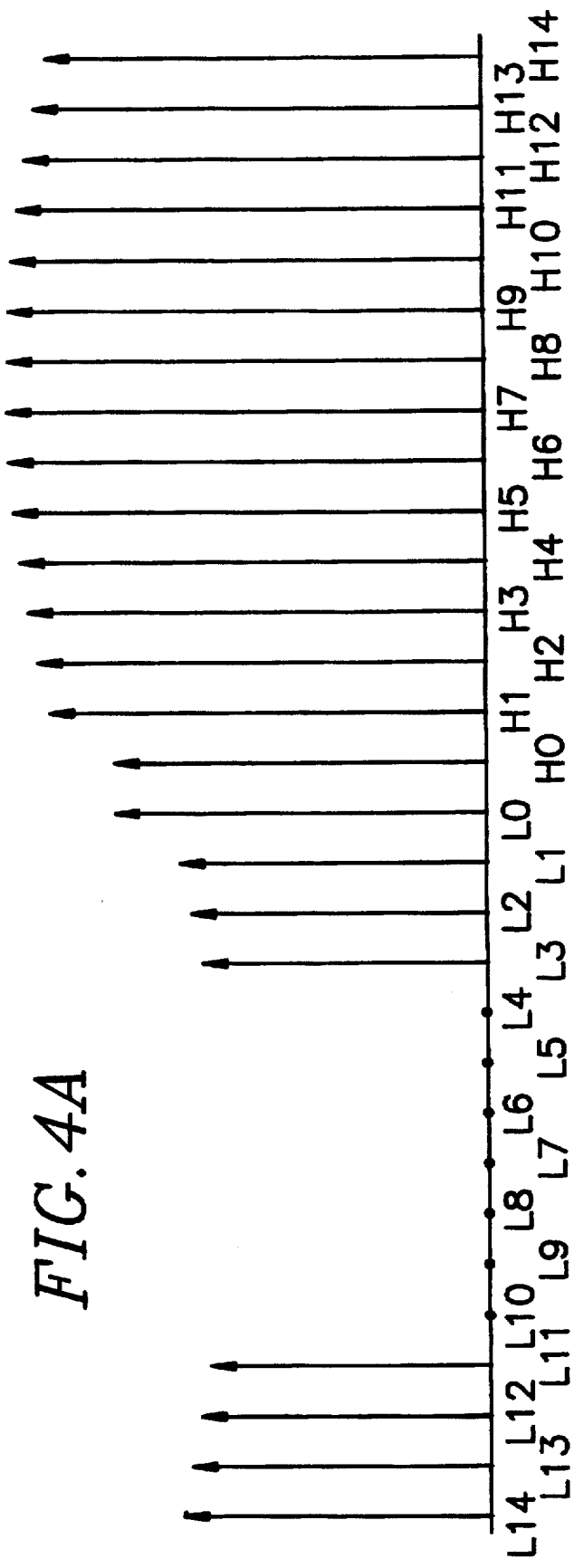
FIGS. 4A and 4B show a 1D sample list and error sample lists corresponding to the contour in FIG. 3, respectively.

Once 15 pairs of sample values for all sample points 0 to 14 on the baseline 20 are obtained as a result of the above process, the sampling block 200 determines a starting point for scanning the 15 pairs of sample values of the contour 10 to thereby extract the 1D sample list from the 15 pairs of sample values. Of two ending points, e.g., the first and the last sample points 0 and 14 on the baseline 20, a sample point whose differential value between the high sample value and the low sample value, i.e., sample values in the pair of sample values for the sample point is greater than that of the other sample point is selected as the starting point. Accordingly, the last sample point 14 in FIG. 3 is chosen as the starting point. In a scanning process, the sampling block 200 traverses from the low(or high) sample value of the starting point, i.e., the last sample point 14, through the low(or high) sample value and the high(or low) sample value of the other ending point, i.e., the first sample point 0, and finally reaches the high(or low) sample value of the starting point 14. The 1D sample list obtained through the scanning process, as shown in FIG. 4A, is provided to a sampling compensation block 300 and the error detection block 400 via a line L10.

Figure 2:
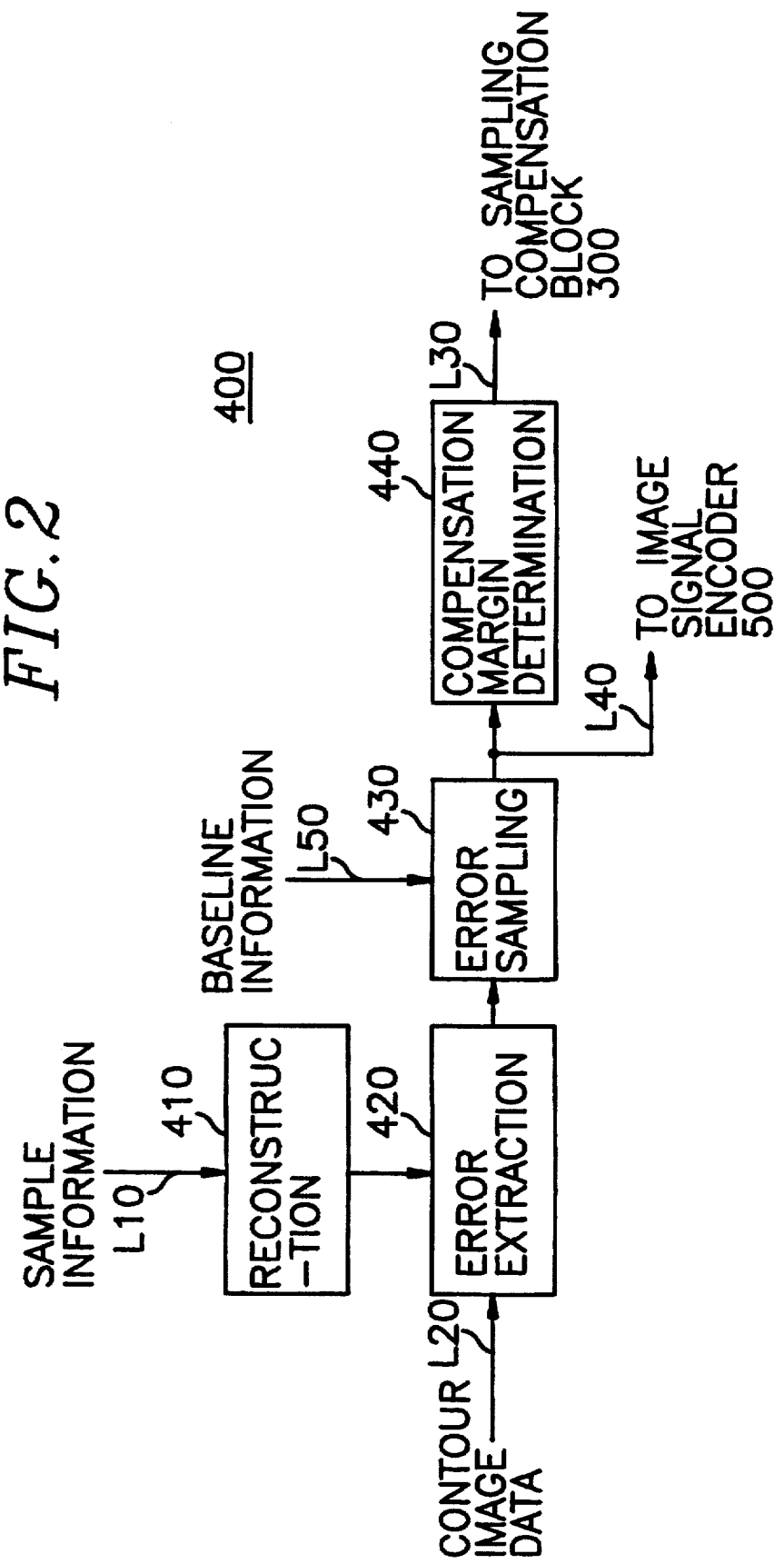
FIG. 2 presents a detailed block diagram of an error detection block 400 shown in FIG. 1.

Referring to FIG. 2, there is presented a detailed block diagram of the error detection block 400 containing a reconstruction sector 410, an error extraction sector 420, an error sampling sector 430 and a compensation margin determination sector 440.

The reconstruction sector 410 creates a reconstructed contour(not shown) based on the 1D sample list on the line L10 from the sampling block 200 and supplies it to the error extraction sector 420.

The error extraction sector 420 subtracts the reconstructed contour from an original contour represented by the contour image data inputted thereto via a line L20 to thereby detect a difference between the original contour and the reconstructed contour as an error component of the reconstructed contour, wherein the original contour is identical to the contour 10 shown in FIG. 3. Therefore, as can be seen in FIG. 3, the error component derived from the subtraction is corresponding to the concaves C1 and C2 because the sample values at the intersection points of the vertical lines with the concaves C1 and C2, being neither the lowest nor the highest, were not included in the 1D sample list.

Figure 4B:
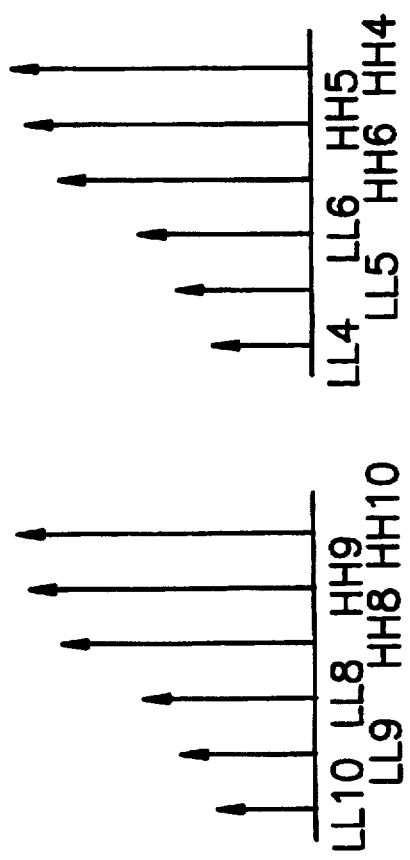

The error sampling sector 430 generates, as depicted in FIG. 4B, an error sample list for each concave C1, C2 of the contour 10 through sampling the error component of the reconstructed contour based on the baseline information on the line L50 in the same manner used at the sampling block 200 in FIG. 1. Accordingly, referring back to FIG. 3, since the concaves C1 and C2 positioned in both sides from the sample point 7 were skipped when the sampling block 200 produced the 1D sample list of the contour 101 the extracted error sample lists for the concaves C1 and C2 consist of the sample values, i.e., (LL4, LL5, LL6, HH6, HH5 and HH4) and (LL10, LL9, LL8, HH8, HH9 and HH10) corresponding to the concaves C1 and C2 as shown in FIG. 4B, respectively. The error sample list for each concave is transferred to the compensation margin determination sector 440 and an image signal encoder 500 via a line L40.

The compensation margin determination sector 440 calculates compensation margins based on the error sample list of each concave in order to use them to reduce the large difference between two adjacent sample values, e.g., L11 and L10 or L4 and L3 described in FIG. 4A, included in the 1D sample list occurred by the concaves C1 or C2 because the large difference between the two adjacent sample values decreases the efficiency of an encoding process of the 1D sample list to be carried out at the image signal encoder 500 in FIG. 1. Consequently, the margins M1 and M2 related to the concaves C1 and C2, respectively, are determined by calculating the absolute differential values between the first and the last sample values, e.g., LL4 and HH4 and LL10 and HH10, respectively, in the error sample list for each concave and they are coupled to the sampling compensation block 300 through a line L30.

Referring back to FIG. 1, the sampling compensation block 300 compensates the large differences between adjacent sample values in the 1D sample list supplied from the sampling block 200 by using the compensation margins M1 and M2 on the line L30. As shown in FIG. 4A, since a differential value between the sample values L11 and L10 is large, it is more advantageous for encoding the 1D sample list to compensate the difference between the sample values L11 and L10 by using the corresponding margin M2 from the compensation margin determination sector 440. In the above, the vertical line at the sample point 11 crosses the outside of the concave C2 while that at the sample point 10 traverses the inside of the concave C2. For the same reason, since a differential value between the sample values L3 and L4 is also large, it is needed to compensate the difference of the sample values L3 and L4 by using the corresponding margin M1 generated from the sector 440. That is to say, the difference of L3 and L4 is induced by the concave C1 as the difference of L11 and L10 by the concave C2.

Figure 5:
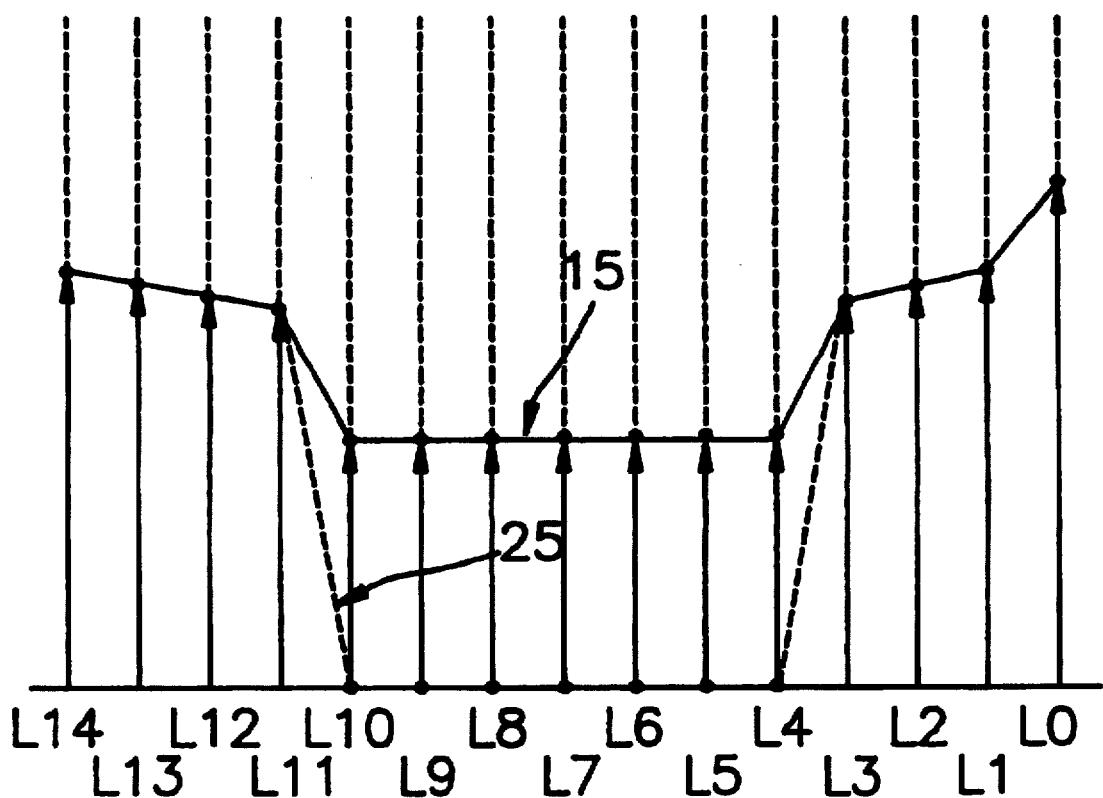
FIG. 5 offers a process for compensating large differential values between adjacent sample values in the 1D sample list in FIG. 4A.

Referring to FIG. 5, there is offered a process for compensating the large differences between adjacent sample values in the 1D sample list. The sampling compensation block 300 first adds the margin M2 related to the concave C2 to the sample values L10 to L0 following the sample value L11 in the sample list in order to decrease the difference between the sample values L11 and L10. Therefore, the sequence of sample values in FIG. 5 are changed to L14, L13, L12, L11, L10+M2, L9+M2, L8+M2, L7+M2, L6+M2, L5+M2, L4+M2, L3+M2, L2+M2, L1+M2 and L0+M2. Subsequently, the sampling compensation block 300 subtracts the margin M1 corresponding to the concave C1 from the increased sample values L3+M2 to L0+M2 derived from the above addition process to minimize the difference that is still existed between the increased sample values L4+M2 and L3+M2. Hence, the sequence of sample values are changed again to L14, L13, L12, L11, L10+M2, L9+M2, L8+M2, L7+M2, L6+M2, L5+M2, L4+M2, L3+M2−M1, L2+M2−M1, L1+M2−M1 and L0+M2−M1. Thereafter, if the concaves C1 and C2 are symmetrical and, thus, the margins M1 and M2 are equal, the sequence of sample values finally becomes L14, L13, L12, L11, L10+M2, L9+M2, L8+M2, L7+M2, L6+M2, L5+M2, L4+M2, L3, L2, L1 and L0. As a result of the above processes, an improved data profile 15 can be obtained compared with an original data profile 25 represented by a dotted line as represented in FIG. 5. That is, the 1D sample list has the profile 15 whose differences between adjacent sample values are smaller than those of the profile 25.

As shown hereinbefore, the data compensation process is accomplished by compensating the large differences, occurred by the presence of the concaves in the contour, between two adjacent sample values in the 1D sample list based on the compensation margins generated from the sample values included in the error sample list of the contour. That is, in the 1D sample list, if the preceding sample value of the two adjacent sample values having a large differential value is greater than the following sample value, the margin of the corresponding concave is added to the sample values following the preceding sample value. On the other hand, if the preceding sample value is smaller than the following sample value in the 1D sample list, the margin of the corresponding concave is subtracted from the sample values following the preceding sample value in the 1D sample list. The compensated 1D sample list through the above addition and subtraction processes is supplied to the image signal encoder 500.

The image signal encoder 500 transforms the compensated 1D sample list from the sampling compensation block 300 and the error sample list on the line L40 from the error detection block 400 into respective sets of quantized transform coefficients, respectively, by using transform methods such as a one-dimensional DCT(discrete cosine transform) and any of the known quantization methods. The sets of quantized transform coefficients are then transmitted therefrom to the entropy coder 600.

At the entropy coder 600, the sets of quantized transform coefficients from the image signal encoder 500 and the baseline information from the baseline determination block 100 are coded together by using, e.g., a known variable length coding technique; and transmitted to a transmitter(not shown) for the transmission thereof.

While the present invention has been described with respect to the particular embodiments, it will be apparent to those skilled in the art that various changes and modifications may be made without departing from the spirit and scope of the invention as defined in the following claims.

What is claimed is:

1. A method for encoding a contour of an object expressed in a video signal, the method comprising the steps of:

(a) determining a baseline based on contour image data representing the contour to thereby provide baseline information;

(b) sampling the contour based on the baseline information to thereby generate a one-dimensional sample list, the one-dimensional sample list having a plurality of sampled values;

(c) producing a reconstructed contour by using the one-dimensional sample list;

(d) extracting a difference between the reconstructed contour and the original contour and sampling it based on the baseline information to thereby create an error sample list;

(e) compensating differences between adjacent sample values in the one-dimensional sample list by utilizing the error sample list; and (f) encoding the compensated one-dimensional sample list, the error sample list and the baseline information, wherein said step (b) includes the steps of:

(b11) combining the baseline and the contour together based on the baseline information and the contour image data;

(b12) taking and indexing N sample points on the baseline, wherein the N sample points are equidistanced on the baseline with N being a positive integer;

(b13) drawing vertical lines to the baseline at each of the sample points;

(b14) selecting a pair among sample values for each sample point, a sample value representing the distance from a sample point to an intersection point between the contour and a vertical line to the baseline at the sample point; and (b15) scanning the pairs of sample values for all sample points to thereby produce the one-dimensional sample list.

2. The method according to claim 1, wherein said step (a) includes the steps of:

(a11) generating a bounding rectangle enclosing the contour tightly; and (a12) selecting the longer between horizontal and vertical sides of the bounding rectangle as the baseline to thereby produce the baseline information.

3. The method according to claim 1, wherein, if a vertical line to the baseline at a sample point intersects with the contour at more than two points, a highest and a lowest sample values corresponding to the sample point are selected as the pair of sample values for the sample point.

4. The method according to claim 1, wherein, if a vertical line to the baseline at a sample point comes in contact with the contour at one point, the sample value at the point serves as the pair of sample values for the sample point.

5. The method according to claim 1, wherein said step (b15) includes the steps of:

(b151) selecting a starting point for scanning between a first and a last sample points; and (b152) scanning sequentially, starting from one sample value in the pair of sample values at the starting point, through all sample values contained in the pairs of sample values at all sample points, thereby producing the one-dimensional sample list.

6. The method according to claim 5, wherein, between the first and the last sample points, a sample point whose differential value between its pair of sample values is greater than that of the other sample point is determined as the starting point.

7. The method according to claim 1, wherein said step (e) includes the steps of:

(e1) determining a compensation margin by calculating differential values between sampled values in the error sample list; and (e2) compensating the differences between adjacent sampled values in the one-dimensional sample list based on the compensation margin.

8. The method according to claim 7, wherein the compensation margin is determined as the absolute differential value between the first and the last sample values in the error sample list.

9. An apparatus for encoding a contour of an object expressed in a video signal, which comprises:

means for determining a baseline based on contour image data representing the contour to thereby provide baseline information;

means for sampling the contour based on the baseline information to thereby generate a one-dimensional sample list the one-dimensional sample list having a plurality of sampled values;

means for producing a reconstructed contour by using the one-dimensional sample list;

means for extracting a difference between the reconstructed contour and the original contour and sampling it based on the baseline information to thereby create an error sample list;

means for compensating differences between adjacent sampled values in the one-dimensional sample list by utilizing the error sample list; and means for encoding the compensated one-dimensional sample list, the error sample list and the baseline information, wherein the sampling means includes:

means for combining the baseline and the contour together based on the baseline information and the contour image data;

means for taking and indexing N sample points on the baseline, wherein the N sample points are equidistanced on the baseline with N being a positive integer;

means for drawing vertical lines to the baseline at each of the sample points;

means for selecting a pair among sample values for each sample point, a sample value representing the distance from a sample point to an intersection point between the contour and a vertical line to the baseline at the sample point; and means for scanning the pairs of sample values for all sample points to thereby produce the one-dimensional sample list.

10. The apparatus according to claim 9, wherein the baseline determining means includes:

means for generating a bounding rectangle enclosing the contour tightly; and means for selecting the longer between horizontal and vertical sides of the bounding rectangle as the baseline.

11. The apparatus according to claim 9, wherein, if a vertical line to the baseline at a sample point intersects with the contour at more than two points, a highest and a lowest sample values corresponding to the sample point are selected as the pair of sample values for the sample point.

12. The apparatus according to claim 9, wherein, if a vertical line to the baseline at a sample point comes in contact with the contour at one point, the sample value at the point serves as the pair of sample values for the sample point.

13. The apparatus according to claim 9, wherein the scanning means includes:

means for selecting a starting point for scanning between a first and a last sample points; and means for scanning sequentially, starting from one sample value in the pair at the starting point, through all sample values contained in the pairs of sample values at all sample points, thereby producing the one-dimensional sample list.

14. The apparatus according to claim 13, wherein, between the first and the last sample points, a sample point whose differential value between its pair of sample values is greater than that of the other sample point is determined as the starting point.

15. The apparatus according to claim 9, wherein the compensation means includes:

means for determining a compensation margin by calculating differential values between sampled values in the error sample list; and means for compensating the differences between adjacent sampled values in the one-dimensional sample list based on the compensation margin.

16. The apparatus according to claim 15, wherein the compensation margin is determined as the absolute differential value between the first and the last sample values in the error sample list.

17. A method for encoding a contour of an object in an image, the method comprising the steps of:

generating a bounding rectangle around the contour;

selecting, as a baseline, a side of the bounding rectangle;

calculating distance information from each of a plurality of spaced apart sample points along the baseline, to each point on the contour which corresponds to said each sample point;

selecting sample values from said distance information, said sample values comprising a shortest and a longest distance calculated for each sample point, said sample values defining a reconstructed contour;

calculating error information reflective of a difference between said distance information and said sample values; and compensating for large differences between sample values corresponding to adjacent sample points, based on said error information, to thereby form compensated sample values; and encoding said compensated sample values, said error information and said baseline.

18. An apparatus for encoding a contour of an object in an image, the apparatus comprising:

means for generating a bounding rectangle around the contour;

means for selecting, as a baseline, a side of the bounding rectangle;

means for calculating distance information from each of a plurality of spaced apart sample points along the baseline, to each point on the contour which corresponds to said each sample point;

means for selecting sample values from said distance information, said sample values comprising a shortest and a longest distance calculated for each sample point, said sample values defining a reconstructed contour;

means for calculating error information reflective of a difference between said distance information and said sample values;

means for compensating for large differences between sample values corresponding to adjacent sample points, based on said error information, to thereby form compensated sample values; and means for encoding said compensated sample values, said error information and said baseline.

* * * * *